Aug. 11, 1942.        T. V. MOORE        2,292,579
REDUCTION OF IRON ORES
Filed Jan. 11, 1940

Thomas V. Moore INVENTOR.
BY
ATTORNEY.

Patented Aug. 11, 1942

2,292,579

UNITED STATES PATENT OFFICE 2,292,579

REDUCTION OF IRON ORES

Thomas V. Moore, Houston, Tex., assignor to Standard Oil Development Company, a corporation of Delaware Application January 11, 1940, Serial No. 313,371

5 Claims. (Cl. 75—40)

The present invention relates to a process for reducing ore and to apparatus for carrying out the process.

It is an object of the present invention to carry out the reduction of iron oxide ores with the use of a gaseous reducing agent.

A further object of the present invention is to carry out the reduction of iron oxide ores in two stages, the first stage involving a heating step and the second involving a reducing step.

A further object of the invention is to provide a process for reducing ores in which it is unnecessary to handle the iron in the viscous state which it assumes at temperatures from about 750° C. up to its melting point.

Figure 1:
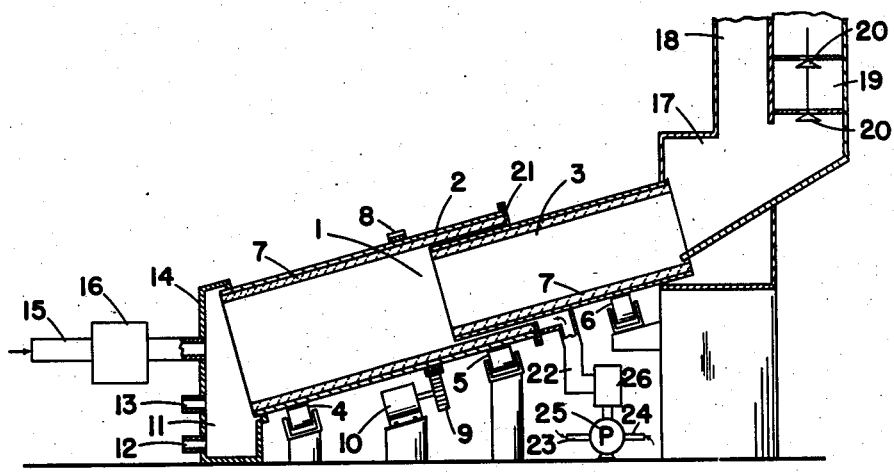
Figure 2:
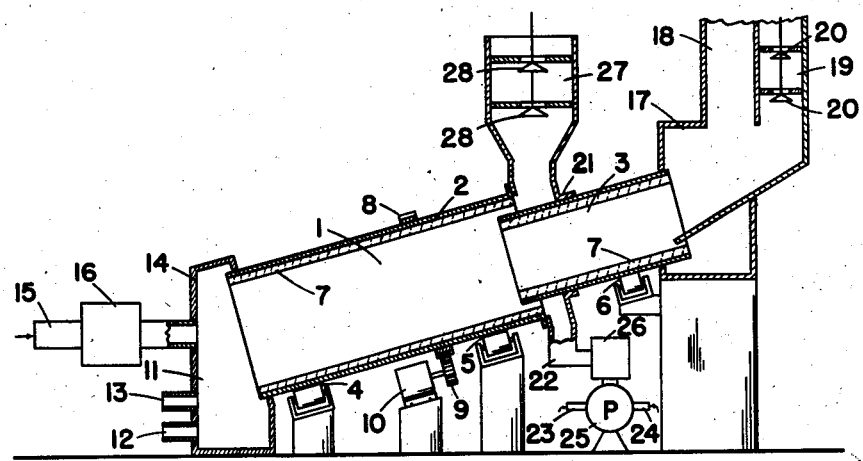

Other objects and advantages of the present invention may be seen by a reading of the description and reference to the drawing in which Fig. 1 is a front elevation, partly in section, of a modification of an apparatus which may be used to carry out the present invention; and Fig. 2 is a front elevation, partly in section, of another modification of apparatus which may be used in practicing the present invention.

It is conventional in the art to reduce iron oxides to metallic iron by adding a charge of iron ore, coke and limestone through the top of a blast furnace, and blowing air up through the furnace. The combustion of the coke produces sufficient heat to cause a reaction between the limestone and the iron ore so that the iron ore is reduced to metallic iron and accumulates in the crucible which is placed in the bottom of the blast furnace. The hot carbon of the coke is an active reducing agent in the blast furnace, but it has long been recognized that the carbon monoxide formed in the furnace by the reaction of the air with the coke is even a more effective reducing agent because it is a gas and can come in better contact with the ore.

It has long been considered desirable to use gaseous fuels and reducing agents in the reduction of the iron ores to metallic iron in the manufacture of pig iron. Previous methods of using gaseous fuels and gaseous reducing agents in the reduction of iron oxides have not, however, met with success, principally because of the viscous characteristics of the iron as it passes from a solid stage to a molten stage. In going from a solid to a liquid state iron passes through a viscous stage in the temperature range from 750° C. to its melting point, and great difficulties are experienced in handling the iron in this temperature range.

In accordance with the present invention, the iron ore as such is heated to a temperature equal to or above the melting point of metallic iron. The heated iron ore is then subjected to a gaseous reducing agent and is reduced to the metallic iron without allowing its temperature to fall below the melting point of the metallic product. The molten iron is subsequently run into the molds to form pig iron. By carrying out the above outlined procedure it is unnecessary to handle the metallic iron at the temperatures in which it is in a viscous stage, that is to say, from the temperature of 750° C. up to the melting point of the iron, which is 1510° C. for the pure iron and somewhat lower for the impure iron generally obtained by the reduction of iron ores.

Broadly speaking then, the present invention is directed to a process of reducing iron ores to metallic iron, the procedure being carried out with gaseous fuel and gaseous reducing agents. In carrying out the process, two steps are involved. In the first step, the iron ore is heated in an oxidizing flame, or at least in a flame in which there is no reducing action, to a temperature of about the melting point of metallic iron. When this temperature is reached, the iron oxide remains in a solid state. This hot iron oxide is next subjected to reducing gases in order to produce metallic iron. The temperature of the two steps of the process are so high that at no time is it necessary to handle the iron in its viscous state.

Referring specifically to the drawing, in Fig. 1 a kiln 1 composed of sections 2 and 3 and provided with a refractory lining 3 is supported by bearings 4, 5 and 6 placed in suitable piers. The kiln is driven by a conventional driving ring 8 which meshes with a gear 9 driven by a motor 10. As shown in the drawing, kiln 1 is placed at an angle with the surface of the earth and beneath its lower end is a crucible 11 provided with a tap hole 12 and a slag hole 13 so that molten materials from the kiln may be run into the crucible and drawn off either by the slag hole or the tap hole. Surrounding the lower end of kiln 1 and the crucible 11 is an apron 14 which makes a fluid-tight joint with kiln 1 and prevents gas from escaping from the joint between the apron and the kiln while the kiln is rotating. A conduit 15 provided with a heater 16 joins apron 14 for reasons which will hereafter appear. The upper end of kiln 1 is provided with an apron 17 which makes a gas-tight connection with the upper end of the kiln in the same way that apron 14 makes a gas-tight connection with the lower end of the kiln. Connecting into apron 17 is a stack 18 and charging hopper 19 which is provided with a conventional double bell shaped door 20.

As seen in the drawing, upper section 3 of kiln 1 is somewhat smaller in diameter than lower section 2. The lower end of section 3 and the upper end of section 2 are concentric. Apron 21 has one side fitting against the upper end of section 2 and its other side fitting closely around section 3, so as to make a gas-tight fit. A conduit 22 having an inlet 23 for gaseous fuel, an inlet 24 for air and provided with a compressor 25 and heater 26 is connected to apron 21.

In the apparatus shown in Fig. 2 like parts bear the same numerals as in Fig. 1. The apparatus shown in this figure is quite similar to that shown in Fig. 1. However, in Fig. 2 apron 21 not only connects at its lower side to conduit 22, heater 26 and compressor 25, but also has at its upper end a connection to hopper 27 provided with double bell-shaped doors 28. In other respects this apparatus corresponds to that shown in Fig. 1.

Various gases are available for addition via conduit 15 to produce the reducing zone in the kiln, and similarly a number of gases are also available to be added via conduit 23 for producing the preheating zone. It is preferred to use hydrogen to produce the reducing zone, and methane as the gas for preheating the iron ore. Other gases, such as carbon monoxide, mixtures of hydrogen and carbon monoxide like water gas and producer gas, as well as methane (natural gas) may be burned in the reducing zone. In like manner, a large number of gases are suitable for use instead of methane for the preheating step. Hydrocarbon gases, such as methane and ethane, are preferred because of their high heat value, but any of the common fuel gases may be used.

In using the apparatus shown in Fig. 1 the charge of iron ore and limestone which acts as a flux is added to the kiln by means of hopper 19 and the double charging doors 20. Reducing gas passing through conduit 15, heater 16 and into apron 14 flows in at the lower end of the kiln and passes up therein, while at the same time air and gaseous fuel entering via inlets 24 and 23 are forced by compressor 25 through heater 26 where preheating takes place and then via conduit 20 into the opening between sections 2 and 3 of the kiln. In section 3 of the kiln the iron ore is heated to a temperature equal to or above the melting point of metallic iron, but since the material remains in the form of the oxide it is in the solid stage while travelling through this section of the kiln. However, as the kiln rotates on its bearings, the charging material is passed downwardly to section 2 where a reducing zone is maintained. Reducing gas causes the iron oxide to be converted to metallic iron, and since the temperature of this section of the kiln is regulated so as to be above the melting point of the iron, the charged material is converted directly from iron oxide to metallic iron at temperatures above the melting point of iron. In other words, in the lower end of the kiln the iron ore is reduced to metallic iron, but in the upper end of the kiln the material is under an oxidizing flame and the iron ore remains in the form of an oxide.

In Fig. 2 the apparatus shown contains not only all of the elements shown by Fig. 1, but in addition shows a hopper 27 provided with double bell-shaped doors 28 which enable solid materials to be added to the apparatus through the annular space between the larger cylinder 2 and the smaller cylinder 3 forming the kiln. In the apparatus shown in Fig. 2 reducing gas is added to the lower end of the kiln 1 by means of conduit 15 and preheated air and gaseous fuel are added to the kiln through the annular space between sections 2 and 3 of the kiln by means of conduit 22. However, it is usually desirable to charge the apparatus shown in Fig. 2 in a somewhat different way than that shown in Fig. 1. Under some circumstances the material which it is desired to add with the iron ore as a flux may dissolve impurities from the iron ore to form a pasty mass while the mass is still in upper section 3. If such conditions are encountered it may be desirable to preheat the flux separately and add it to the lower portion of the kiln by means of hopper 27 provided with charging doors 28. If the process is carried on by preheating the material to be used as a flux separately and then adding it by means of hopper 27, the iron ore is heated in an oxidizing flame in the upper end of the kiln to a temperature above the melting point of iron, and then, as it passes from the oxidizing zone to the reducing zone it has a flux added to it to aid in forming molten iron which runs down the kiln and into the crucible 11 where the slag may be drawn off through outlet 13 from time to time and the metallic iron withdrawn through tap hole 12.

While I have shown preferred modifications of the present invention, it is obvious that various changes may be made in the apparatus without departing from the scope of the present invention. For example, while I have shown independent heaters, on some occasions heat exchangers placed in the stack and utilizing the heat of the combustion gases may be used. It is also evident that these heaters may be independently fired or they may be "stoves" which are well known to the blast furnace art and which are heated by burning the stack gases.

It will be obvious that on some occasions the heaters for either the reducing gas or the gaseous fuel and air, or for both may be eliminated and the reducing gas may be passed directly into the kiln without a preliminary heating step. It will also be obvious that when carrying out the process using the apparatus shown in Fig. 2 preheating of the flux added by hopper 24 may at times be dispensed with. On some occasions it may be desirable to add sufficient gas in the lower portion of the kiln to carry out both the reduction step and the preheating step.

While I have disclosed specific modifications of the present invention and have given specific examples, I do not intend to be bound by these specific modifications and examples, but intend to claim my invention as broadly as the prior art permits.

I claim:

1. A continuous process of converting an iron ore to metallic iron, comprising the steps of continuously moving iron ore through an atmosphere of hot, non-reducing gases, the temperature of said gases and the time of contact of the ore with said gases causing said ore to be heated above the melting point of said iron, but below the melting point of said ore, without reduction of said ore, continuously removing heated ore from said non-reducing atmosphere to a reducing atmosphere without allowing its temperature to fall below the melting point of iron, continuously passing the heated material through an atmosphere of hot reducing gases while maintaining its temperature above the melting point of iron, the temperature of the gases and the time of contact with said reducing gases being sufficient to convert said ore to metallic iron, and continuously removing iron from said hot reducing atmosphere.

2. A process in accordance with claim 1 in which the reducing gas is hydrogen.

3. A process in accordance with claim 1 in which the reducing gas is methane.

4. A process in accordance with claim 1 in which the reducing gas is a mixture of hydrogen and carbon monoxide.

5. A process of converting an iron ore to metallic iron, comprising the steps of continuously moving iron ore through an atmosphere of hot non-reducing gases, the temperature of said gases and time of contact of the ore with said gases causing the ore to be heated above the melting point of said iron, but below the melting point of said ore without reduction of said ore, continuously removing heated ore from said non-reducing atmosphere to a reducing atmosphere without allowing its temperature to fall below the melting point of iron, adding fluxing materials to said heated iron ore after it is removed from the atmosphere of non-reducing gases, continuously passing the heated iron ore through an atmosphere of hot reducing gases while maintaining its temperature above the melting point of iron, the temperature of the gases and time of contact with said gases being sufficient to convert said ore to metallic iron, and continuously removing iron from said hot reducing atmosphere.

THOMAS V. MOORE.